US005950156A

United States Patent [19]

Ueno et al.

[11] Patent Number: 5,950,156

[45] Date of Patent: Sep. 7, 1999

[54] HIGH EFFICIENT SIGNAL CODING METHOD AND APPARATUS THEREFOR

[75] Inventors: Masatoshi Ueno; Shinji Miyamori, both of Tokyo, Japan

[73] Assignee: Sony Corporation, Tokyo, Japan

[21] Appl. No.: 08/723,516

[22] Filed: Sep. 30, 1996

[30] Foreign Application Priority Data

Oct. 4, 1995 [JP] Japan .................................... 7-257593

[51] Int. Cl.[6] ........................................................ G01L 3/02

[52] U.S. Cl. ........................... 704/230; 704/224; 704/229

[58] Field of Search ..................................... 704/224, 229, 704/230, 204, 200, 226, 205, 500, 501, 206, 207; 381/17

[56] References Cited

U.S. PATENT DOCUMENTS

| | | | |
|---|---|---|---|
| 5,583,967 | 12/1996 | Akagiri | 704/229 |
| 5,588,024 | 12/1996 | Takano | 704/229 |
| 5,680,130 | 10/1997 | Tsutsui et al. | 704/501 |
| 5,682,461 | 10/1997 | Silzle et al. | 704/207 |
| 5,717,821 | 2/1998 | Tsutsui et al. | 704/207 |
| 5,737,720 | 4/1998 | Miyamori et al. | 704/229 |
| 5,758,316 | 5/1998 | Oikawa et al. | 704/230 |

OTHER PUBLICATIONS

U.S. Application Serial No. 08/374,518.

*Primary Examiner*—Richemond Dorvil
*Attorney, Agent, or Firm*—Limbach & Limbach LLP; Seong-Kun Oh

[57] ABSTRACT

An apparatus and method for high efficient signal coding by separating frequency components obtained by converting an input signal into tone property component signals and the other component signals by using a mask level obtained based on the psychoacoustic model and coding these signals respectively to increase signal coding quality and efficiency.

16 Claims, 11 Drawing Sheets

HIGH EFFICIENT SIGNAL CODING METHOD AND APPARATUS THEREFOR

BACKGROUND OF THE INVENTION

1. Field of the Invention

This invention relates to a signal coding method and an apparatus therefor wherein an input signal such as digital data is coded by so-called high-efficient coding.

2. Description of the Related Art

Conveniently, a variety of methods for high-efficient coding of signals such as audio and acoustic sounds, and apparatuses therefor are available. For example, a so-called conversion coding method in which signals residing on time axis are framed by the given time, each framed signals on the time axis are converted into signals on frequency axis (spectral conversion) and divided into a plurality of frequency areas and coded for each band, and so-called subband coding (SBC) method in which audio signals, etc. on the time axis are divided into a plurality of frequency bands without being framed and coded are well-known methods. Further, high-efficient coding methods and apparatuses by combination of the aforementioned band division coding and conversion coding have been also conceived. In this case, after divided into bands by the aforementioned band division coding method, for example, signals in each band are spectrum-converted into signals on the frequency axis and signals of each spectrum-converted band are subjected to coding.

As a band division filter to be used for the aforementioned band division coding method, for example, Quadranture Mirror Filter (QMF) or the like are currently available. This has been stated in a reference Digital coding of speech in subbands (R. E. Crochiere, Bell Syst. Tech.J., Vol. 55, No. 8 1976). This QMF filter divides a band into two with equal band widths. The feature of this filter is that no aliasing occurs when the band portions divided as mentioned above are synthesized.

Additionally, a reference Polyphase Quadrature filters—A new subband coding technique states a band division method in which a signal is divided into bands with equal bandwidth using a filter. This polyphase quadrature filter is characteristic in that division of a signal into a plurality of equal width bands can be done at a time.

As the spectral conversion method mentioned above, some spectral conversion methods are known in which input audio signals are framed by a given time and each frame is subjected to discrete Fourier transform (DFT), discrete cosine transform (DCT) or modified discrete cosine transform (MDCT) or the like to convert time axis to frequency axis. Meanwhile, the aforementioned MDCT is stated in a reference "Subband/Transform Coding Using Filter Bank Designs, Based on Time Domain Aliasing Cancellation," J. J. Princen A. B. Bradley, Univ. of Surrey Royal Melbourne Inst of Tech. ICASSP 1987.

By quantizing signals divided into respective bands by use of the filter or spectral conversion as stated above, it is possible to control a band in which quantizing noise occurs and perform high-efficient coding in auditory sense by using a so-called masking effect or the like. Further, if each band is normalized with a maximum value of the absolute values of signal components within that band, further high-efficient coding can be done.

Here, as a frequency division width for quantizing each frequency components divided into a frequency band, for example, a band width taking the auditory characteristic of the human being into account is often used. Namely, this is a band width called critical band in which generally the band width increases as the band becomes higher and audio signals are sometimes divided into a plurality of bands (for example, 25 bands). In this case, when data of each band is coded, the coding is carried out by distributing given bits to each band or allocating bits adaptive for each band (bit allocation). For example, when coefficient data obtained by the aforementioned MDCT processing is coded by the above-mentioned bit allocation, the coding is carried out by allocating adaptive bits to the MDCT coefficient data of each band obtained by the MDCT processing in each of the aforementioned frames.

As the bit allocation method stated above, the following two methods are well known.

For example, a reference Adaptive Transform Coding of Speech Signals, R. Zelinski, P. Noll, IEEE Transaction of Acoustics, Speech, and Signal Processing, vol.ASSP-25, No. 4, August 1977 states that the bit allocation is carried out based on the size of signals in each band. According to this method, although quantizing noise spectrum flattens so that noise energy minimizes, perception to noise in terms of actual auditory sense is not optimum because the masking effect is not audibly utilized.

Further, for example, a reference The critical band coder-digital encoding of the perceptual requirements of the auditory system M. A. Kransner MIT, ICASSP 19800 states a method in which a signal-to-noise ratio necessary for each band is obtained by using the auditory masking to carry out fixed bit allocation. However, according to this method, because its bit allocation is fixed even when measuring a characteristic by sine wave input, the characteristic value is not so good.

To solve these problems, a high-efficient coding apparatus has been proposed in which all bits which can be used for bit allocation are divided into a preliminarily fixed allocation pattern portion for each band or each block obtained by dividing each band and a portion for carrying out a bit allocation dependent on the size of signals in each block, and the division ratio is made to depend upon signals related to input signals so that the ratio of division to the aforementioned fixed bit allocation pattern portion increases as the spectral distribution of the signals becomes smoother.

According to this method, for example, when energy is concentrated on a specific spectral component such as in the case of sine wave input, by allocating more bits to a block containing that spectral component, it is possible to considerably improve the overall signal-to-noise characteristic. Generally, because the auditory sense of the human being is very keen to signals having a steep spectral distribution, improvement of the signal-to-noise characteristic by using such a method not only simply improves measurement values but also is effective for improvement of sound quality in terms of auditory sense.

Meantime, in addition to this method, there have been proposed many other methods of bit allocation. If the model for the auditory sense is made more precise and the capacity of the coding apparatus is improved, a further high-efficient coding in terms of the auditory sense can be realized.

However, because in the above-described conventional method a band in which the frequency components are quantized is fixed, for example if the spectral components are concentrated in the vicinity of some specific frequencies, quantization of those spectral components at full precision requires a number of bits to be allocated to a number of the spectral components which belong to the same band as those spectral components, thereby reducing the efficiency.

That is, generally, noise contained in tone property acoustic signals in which energy is concentrated on specific spectral components is perceptible as compared to, for example, noise in acoustic signals in which energy is distributed smoothly over a wide frequency range, so that it becomes a large obstacle in terms of the auditory sense. Further, unless the spectral components having a large energy or the tone property components are quantized at full precision, when those spectral components are returned to waveform signals on the time axis so as to be synthesized with frames in the front and back, there occurs a large distortion between the frames (when the spectral components are synthesized with the waveform signals of a time frame adjacent, there occurs a large connection distortion), thereby also providing an obstacle to the auditory sense. Thus, according to the conventional methods, it has been difficult to improve coding efficiency of particularly the tone property acoustic signals without deteriorating the sound quality.

To solve this problem, an applicant of this invention proposed in the specification and drawings of U.S. patent application Ser. No. 08/374,518 (filed May 31, 1994), now issued as U.S. Pat. No. 5,717,821 on Feb. 10, 1998, a method in which input acoustic signals were separated into tone property components in which energy is concentrated to a specific frequency and components (noise property components or non-tone property components) in which energy is distributed smoothly over a wide band to code them respectively, thereby achieving a high coding efficiency.

That is, according to this method previously proposed, the aforementioned input acoustic signals are converted in terms of frequency and then each frequency component (spectral component) obtained thereby is further divided, for example, by critical band. Then, the spectral components of each divided band are separated to the tone property components and noise property components (non-tone property components) and a number of bits are allocated to only each of the separated tone property components (spectral components in a very narrow range on the frequency axis in which the tone property components in the band reside) in order to achieve high-efficient coding. Meanwhile, as a very narrow range on the frequency axis in which the aforementioned tone property components exist, for example, a range including a given number of the spectral components substantially consisting of the spectral components containing a maximum energy which is each tone property component may be picked up as one of its examples.

According to the aforementioned method which will be proposed later, by carrying out the above-described processing, it is possible to realize more high-efficient coding as compared to the method of quantizing spectral components residing within each of the aforementioned fixed bands. The spectral components codes as mentioned above are recorded in a recording medium together with positional information of the tone property components corresponding to the frequency axis or transmitted to a transmission path.

However, because the spectral components constituting the acoustic signals are complicated, the spreading of respective spectral components constituting the tone property components on the frequency axis varies. That is, in the case of sine waves, the energy of the spectral components decreases quickly as they depart from that frequency, so that most energy is concentrated on a very small number of the spectral components. On the other hand, although the tone property components may be extracted in the case of an ordinary musical instrument, the respective tone property components in the spectral components composed of acoustic signals obtained by play of the musical instrument do not have so steep an energy distribution as in the case of sine wave. Additionally, the spreading of energy distribution of the spectral components constituting the tone property components largely varies depending upon the kind of the musical instrument.

In the case of the aforementioned U.S. patent application Ser. No. 08/374,518, now issued as U.S. Pat. No. 5,717,821, when extracting the tone property components, a spectrum having a large peak is specified as a tone property spectrum and then, two spectrums adjacent that spectrum are specified as the tone property spectrums. Thus, the tone property spectrums are always extracted in the unit of three.

Here, when a given number of the spectral components which are mainly ones having a maximum energy as the tone property component are normalized and quantized, if the quantity of the spectral components increases, a given number of bits are required to quantize very small spectral components far away from the center spectral component, which can be neglected in terms of the auditory sense to the tone property components having a very steep spectral energy distribution, and the coding efficiency is deteriorated.

On the other hand, if the quantity of the spectral components is decreased, it is required to separately code spectral components which cannot be neglected to the tone property components having a very smooth spectral energy distribution in terms of the auditory sense separately from those tone property components, and the overall coding efficiency is recorded. Thus, it has been necessary to extract the tone property component spectrums effectively.

SUMMARY OF THE INVENTION

Accordingly, this invention has been implemented to solve the above-described problems and it is an object thereof to provide a signal coding method and an apparatus therefor wherein more effective coding is realized.

According to the signal coding method of the present invention, the aforementioned problems are solved by separating frequency components obtained by converting an input signal into tone property component signals and the other component signals by using a masking level obtained based on the psychoacoustic model and then coding these signals respectively.

Namely, according to the present invention, the coding quality and efficiency are increased by separating the tone property components from the frequency components obtained by converting input signals, by using the auditory psychoacoustic model.

The present invention will now be described further, by way of example only, with reference to the accompanying drawings;

DESCRIPTION OF THE PREFERRED EMBODIMENT

Hereinafter, preferred embodiments of the present invention will be described with reference to appended drawings.

Figure 1:
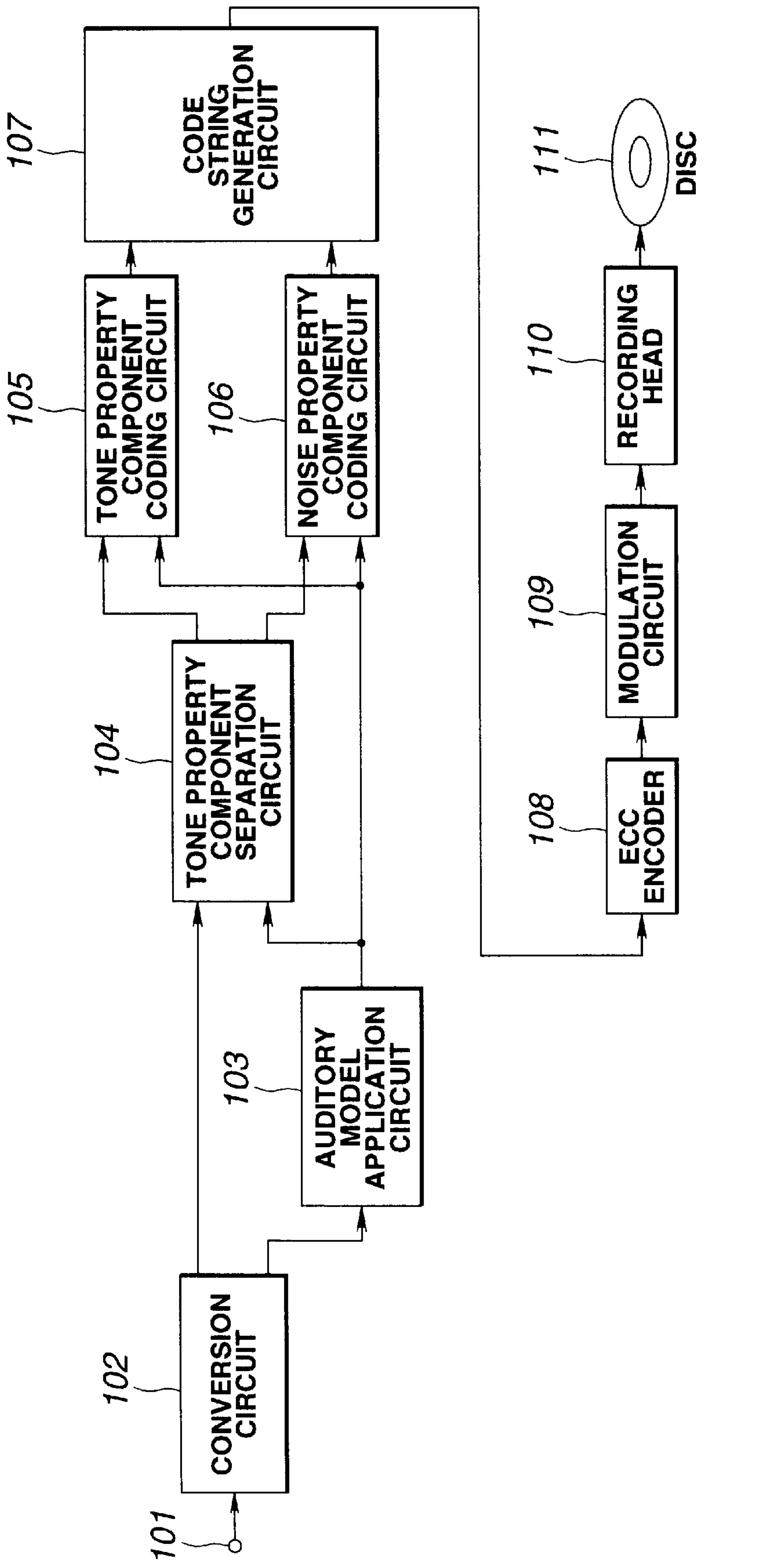
FIG. 1 is a block circuit diagram showing a schematic arrangement of a signal coding apparatus of the present invention in which a signal coding method of the present invention is applied.

FIG. 1 schematically shows an arrangement of a signal coding apparatus which is an embodiment of the present invention to which the signal coding method of the present invention is applied.

Namely, the signal coding apparatus of the present invention includes a conversion circuit 102 for converting an input signal into frequency components (hereinafter referred to as spectral components), a psychoacoustic model application circuit 103 in which a psychoacoustic model is applied to the aforementioned spectral components to produce results of that analysis, a tone property component separation circuit 104 which is a separation means for separating the aforementioned spectral components into a first signal consisting of tone components and a second signal consisting of the other components by using the results of the analysis of the above psychoacoustic model, a tone property coding circuit 105 which is a first coding means for coding the above-mentioned first signal or the tone property components for each specified coding units by using the analysis results of the aforementioned psychoacoustic model, and a noise property component coding circuit 106 which is a second coding means for coding the aforementioned second signal or the noise property components for each specified coding unit by using the analysis results of the aforementioned psychoacoustic model.

Referring to FIG. 1, an acoustic wave-form signal is supplied to a terminal 101. This acoustic wave-form signal is converted into signal frequency components (spectral components) by the conversion circuit 102 and the signal frequency components are sent to the psychoacoustic model application circuit 103 and the tone property component separation circuit 104. Detailed structure of the conversion circuit 102 will be described later.

The psychoacoustic model application circuit 103 calculates an appropriate masking level for the spectral components by applying the psychoacoustic model to the spectral components obtained by the conversion circuit 102.

That is, the psychoacoustic model application circuit 103 recalculates a temporary masking level obtained by using, for example, minimum audible level or masking characteristics or loudness characteristics obtained from each supplied spectral component as explained above for each frequency corresponding to each spectral component of the signal frequency obtained by the conversion circuit 102 or each band to which the signal frequency is divided, thereby obtaining an appropriate masking level corresponding to each of the spectral components.

It is generally said that the frequency range which the human auditory sense can perceive is in the range of 16–20,000 Hz. The minimum audible level which is the smallest sound to be heard has a frequency characteristic. That is, as compared to sounds near 2,000–4,000 Hz which can be heard most excellently, a sound of 100 Hz is not audible unless it is larger by about 20 dB. By using this characteristic, calculation of the masking level can be approached to a state appropriate in terms of auditory sense. The auditory sense has a characteristic that a large sound disables a concurrent small sound from being heard. This characteristic that a single sound disables other sounds from being heard is called masking. Generally, according to this characteristic, a low sound is likely to mask a high sound, however, a high sound is unlikely to mask a low sound, and if a sound for masking is weak, only sounds adjacent are masked, however if strong, high sounds at a distance are also masked. By using this characteristic, it is also possible to make calculation of the masking level approach a state appropriate for the auditory sense.

The masking level is a threshold for deciding sounds below a given level does not need to be coded because they cannot be sensed auditorily, and appropriate as a threshold used in determining tone or noise. Thus, using at least one of the above-mentioned three characteristics makes determination of tone or noise appropriate for auditory sense and a further combination of the characteristics increases that effect.

By using the masking level obtained by aforementioned psychoacoustic model application circuit 103, the tone property component separating circuit 104 separates the spectral components obtained by the conversion circuit 102 into the tone property components which are of the first signal having a steep spectral distribution and the noise property components (non-tone property components) which are of the second signal having the other spectral components or a flat spectral distribution.

Here, an example of the method for separating the tone property components will be described with reference to FIGS. 2 and 3. In this example, four spectral lines and five spectral lines are indicated in (A) and (B), (C), (D) respectively as tone property component by each broken line.

By the way, as for a difference between the tone property component and the noise property component, while there are spectrums clearly determined to be of tone property components if deciding in the whole range, there are also spectrums that are difficult to determine whether they belong to tone property component or noise property component. Thus, in the aforementioned example, of components having a steep spectral distribution, upper several spectral lines counted from a maximum level spectrum are determined to be of tone property components.

Meanwhile, because the tone property components are distributed concentratedly in small-quantity spectral components, precision quantization of these components does not need so many number of bits on the whole.

Although coding efficiency can be increased by quantization after normalizing of the tone property components, it is possible to omit the procedures of normalization and quantization to simplify the apparatus, because the quantity of respective spectral components constituting the tone property components is relatively small. Meanwhile, [1]–[5] in FIG. 2 indicate division bands.

Figure 2:
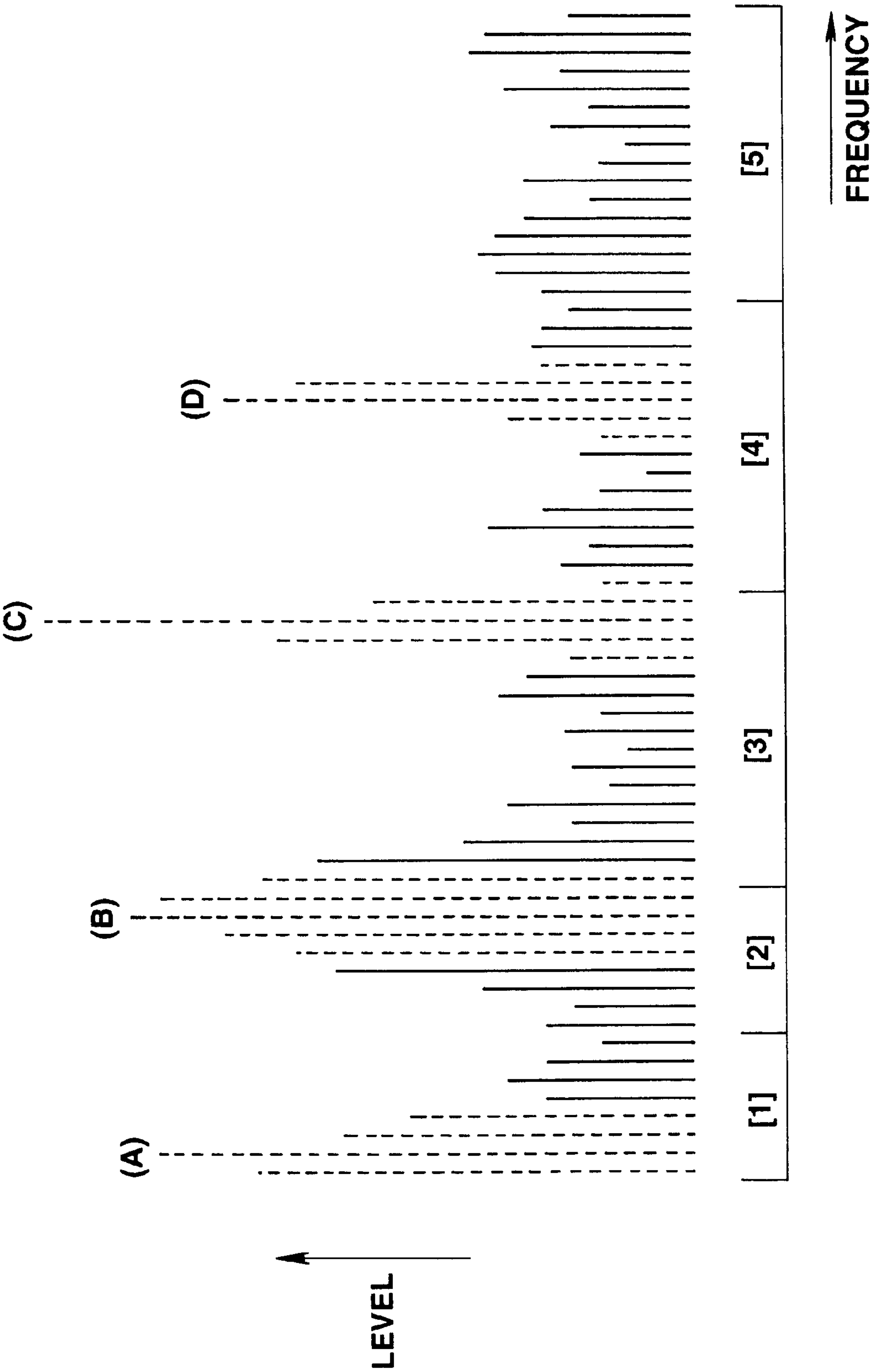
FIG. 2 is a diagram for explaining an example of a method of separating a tone property component.
Figure 3:
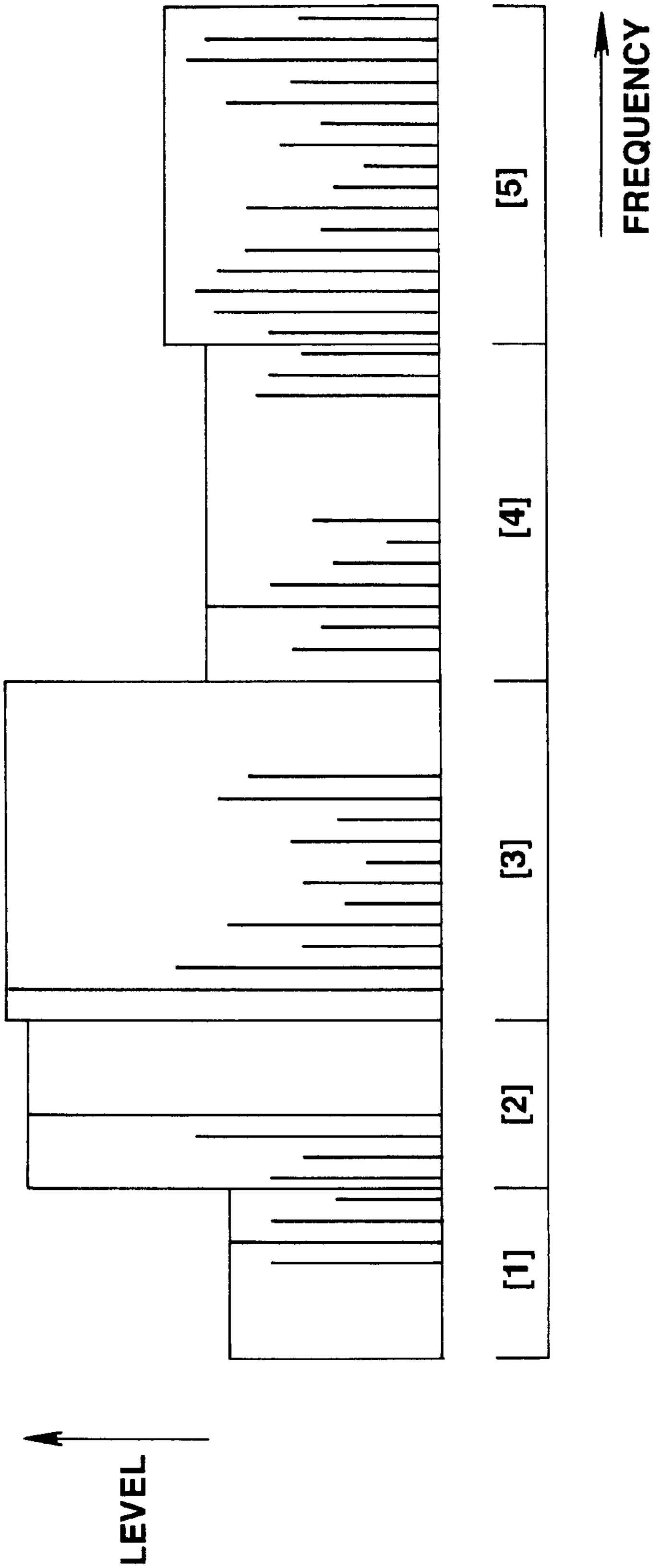
FIG. 3 is a diagram for explaining a noise property component obtained by separating the tone property component shown in FIG. 2.

FIG. 3 shows remaining noise property components after the tone property components (A), (B), (C), (D) indicated by each broken line in FIG. 2 are removed from the respective original spectral components. Because these tone property components have been removed as mentioned above, the normalization coefficient of each band is a small value, so that it is possible to reduce quantization noise which may occur in even small bit count.

By separating the tone property components and the noise property components, it is made possible to efficiently code as compared to a method in which normalization and quantization are conducted for each of fixed bands as mentioned above. However, according to the method shown in FIG. 2, the number of spectral components constituting respective tone property components is fixedly set (In an example of FIG. 2, it is set to five). Thus, there are left relatively large spectral components as the noise property components residing in the bands [2] and [3] as shown in FIG. 2. Thus, as evident in FIG. 3, these spectrums in the bands [2] and [3] are subjected to normalization and quantization as noise property component so that the efficiency of coding decreases.

On the other hand, as to the tone property components (C) and (D) in FIG. 2, of five pieces extracted as the tone property components, the fourth and fifth smallest-energy spectral components away from its maximum spectral component are also subjected to coding as the tone property components. Quantization of these small-energy spectral components at sufficient precision requires a number of bits. However, coding of such small-energy spectral components as spectrum of the tone property components is not efficient. Further, sound improvement effect is small despite the allocation of such a number of bits.

Figure 4:
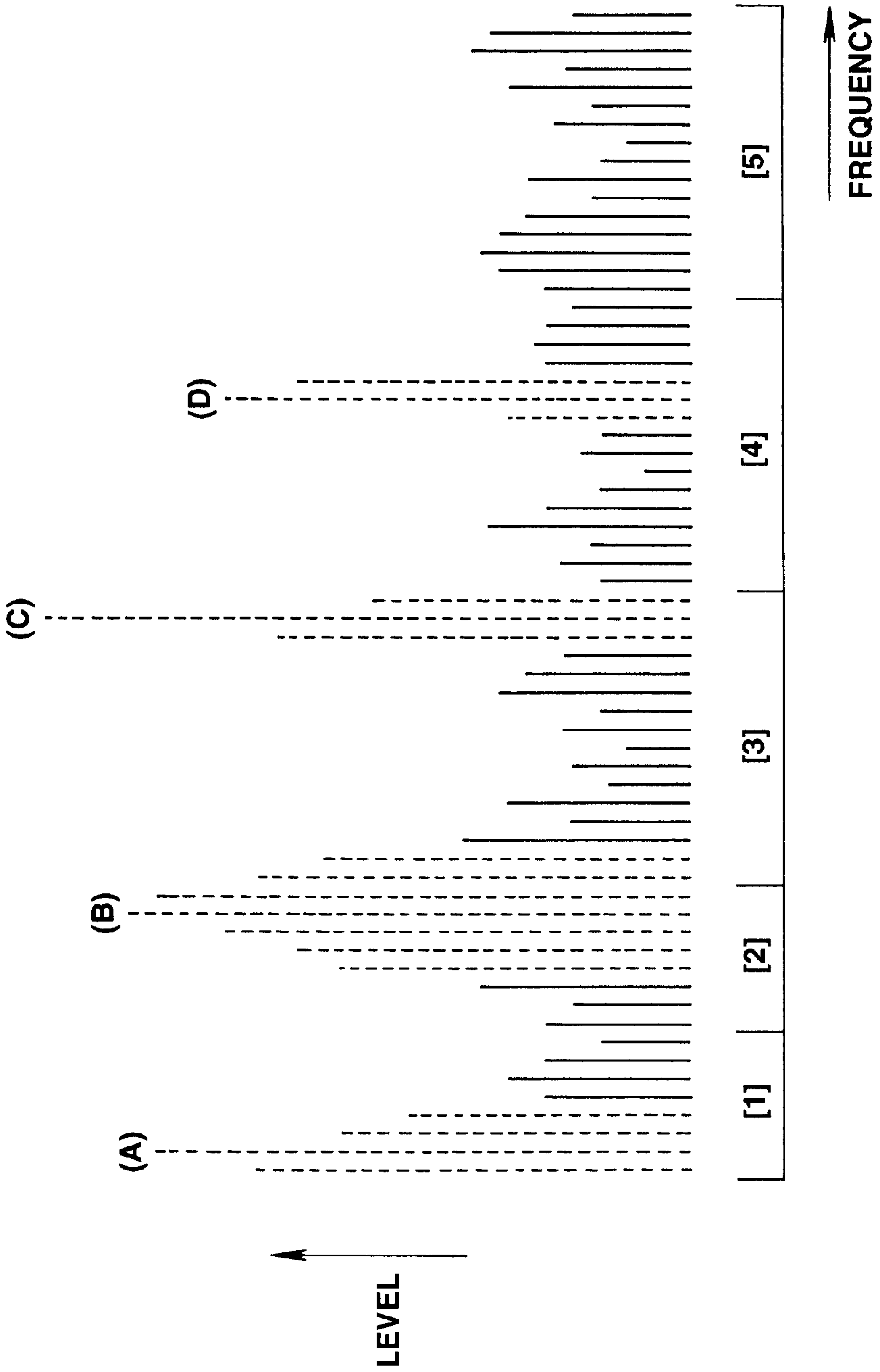
FIG. 4 is a diagram for explaining a method of separating the tone property component to be used in the signal coding method of the present invention.

According to the signal coding method of the present invention, as shown in FIG. 4, the quantity of spectral components to be extracted as the tone property components is changed by using a masking level obtained based on the aforementioned psychoacoustic model.

Namely, as for the tone property components (A), four spectral components are extracted, and as for the tone property components (B), seven spectral components are extracted, and as for the tone property components (C), (D), three spectral components are extracted each.
Details of the application method of the masking level will be described later.

Figure 5:
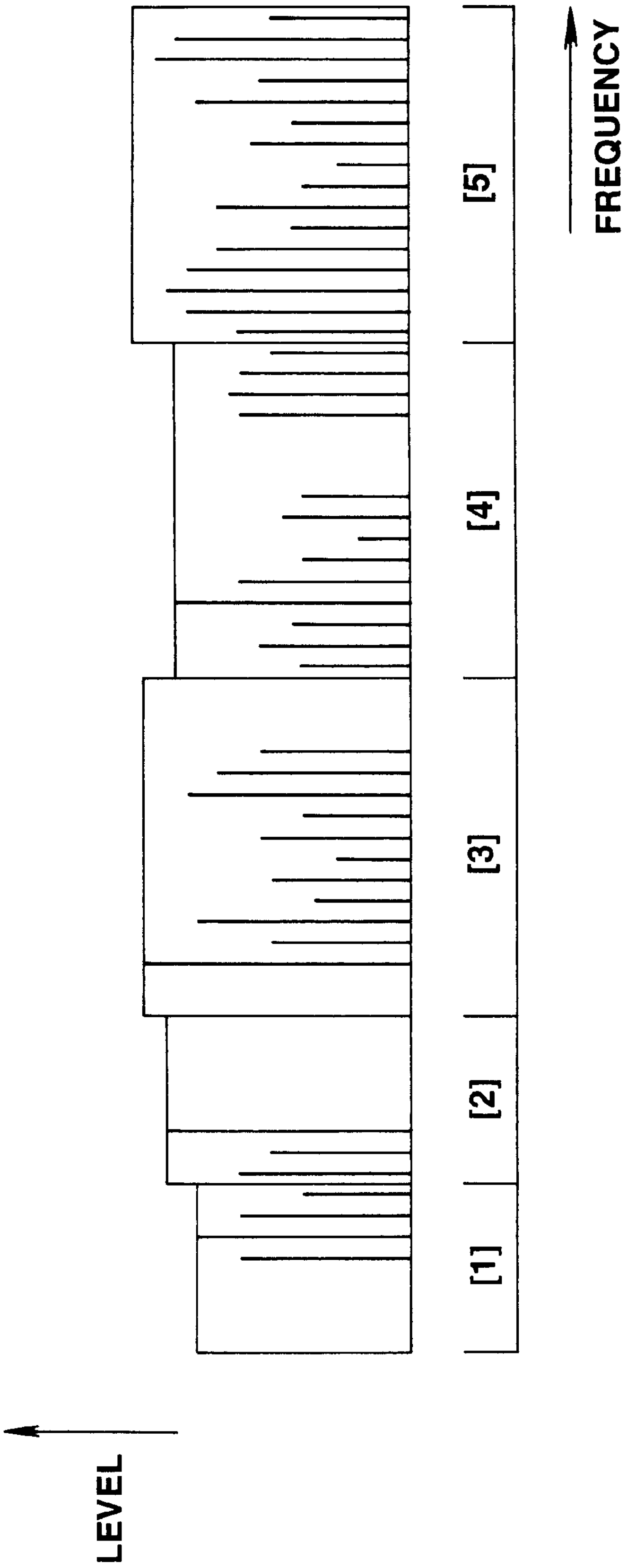
FIG. 5 is a diagram for explaining the noise property component obtained by separating the tone property component according to the signal coding method of the present invention.

FIG. 5 shows remaining noise property components after the tone property components (A), (B), (C), (D) indicated by broken lines in FIG. 4 are removed from the respective spectral components in FIG. 4. As evident from comparing this FIG. 5 with the aforementioned FIG. 3, the maximum level of the spectrum contained in the division bands [2], [3] is small. Thus, a normalization coefficient necessary for this case may be of small value so that the coding efficiency can be increased.

Further, as evident comparing FIG. 2 with FIG. 4, the quantity of spectral components to be coded as tone property components decreases in FIG. 4, therefore it is possible to raise the coding efficiency.

Figure 6:
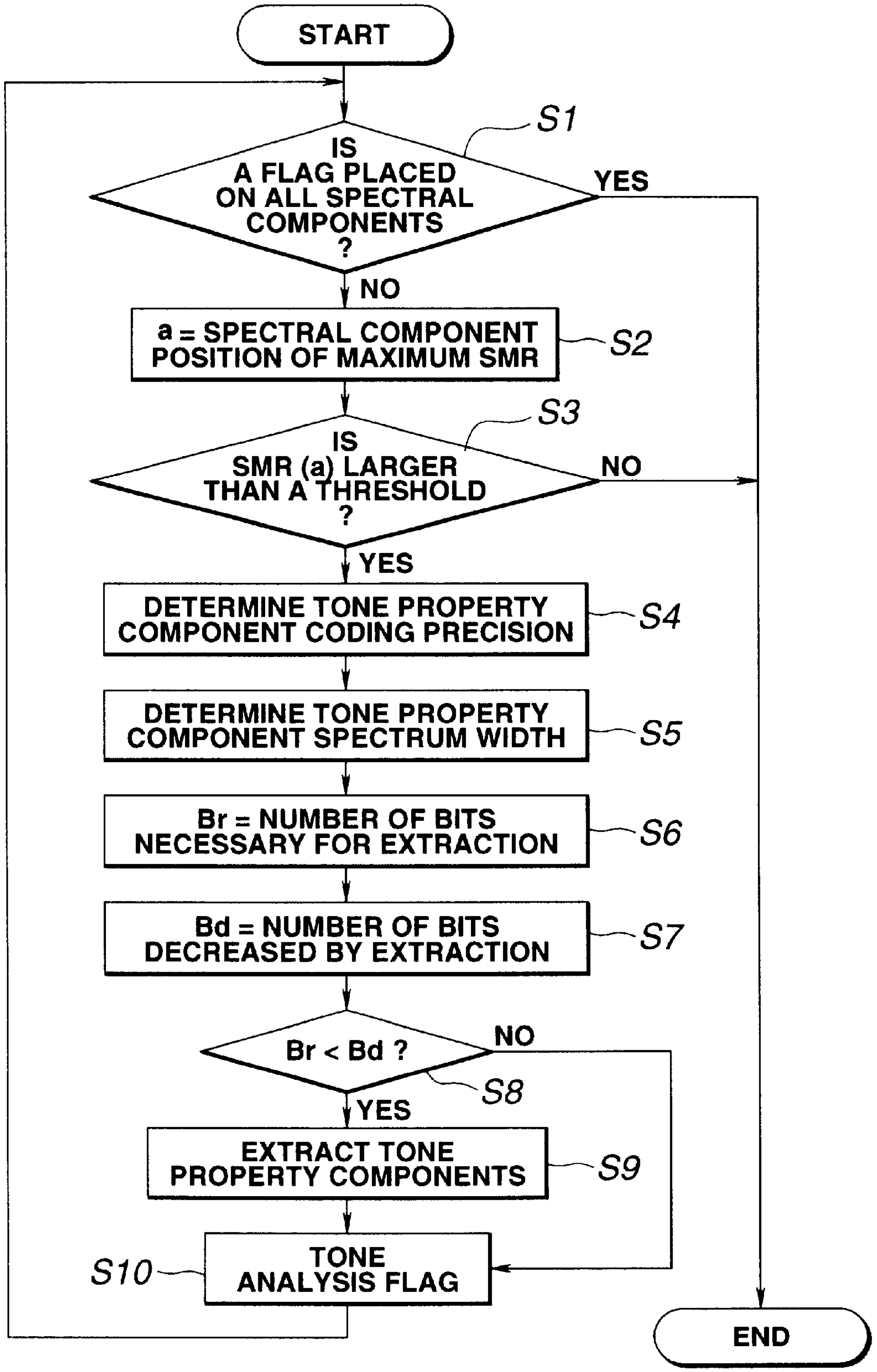
FIG. 6 is a flow chart showing a sequence of the operations of an auditory model application circuit contained in the signal coding apparatus which is an example of the arrangement according to the present invention.

FIG. 6 is a flow chart showing an example of processing for separating the tone property components from the respective spectral components by means of the tone property component separating circuit 104 by using the masking level sent from the aforementioned psychoacoustic model application circuit 103. SMR (signal masking level) in FIG. 6 indicates a difference of spectral property component obtained by the conversion circuit 102 from masking level in each spectral property component obtained by the psychoacoustic model application circuit 103. SNR in FIG. 6 denotes a signal noise ratio obtained when the number of bits is added for the coding and a, Br, and Bd denote given coefficient respectively.

Referring to FIG. 6, first in step S1, an analysis flag to be written into a spectral component in which its tone property component is extracted and investigated in step S10, is investigated and if flags are written in all the spectral property components, the processing is terminated. Otherwise, the processing proceeds to step S2.

In step S2, regarding all the spectral components in which no analysis flag is written, residing within a frequency band from which its tone property component is to be extracted, a difference between the absolute value of its spectral component level and a masking level, namely SMR, is calculated. The position of a spectral component presenting the maximum SMR is entered into the variable a.

Then in step S3, if the SMR(a) which is the value of SMR of a given spectral component at a position a is larger than the threshold of a level valid as the tone property component, that is, if it satisfies SMR (a)>SNR (min) as compared to the SNR (min) which is the value of SNR in which a minimum number of bits larger than 0 bit are allocated, the processing proceeds to step S4. Otherwise, the processing is terminated. This prevents a spectral component having a small SMR from being extracted as tone property component.

The reason why this criterion for discrimination is effective for discriminating whether a sound is a tone property component or a noise property component will be explained below. Namely, the fact that a spectrum is largely apart from the noise level means that the spectrum is easy to perceive in terms of auditory sense. Thus, that spectrum needs into be classified to tone property component spectrum.

In step S4, the coding precision of a tone property component is determined. If the coding precision of the tone property component is a minimum x which satisfies SMR (a)<SNR(x) with respect to the SMR (a) which is a SMR of the aforementioned spectral property component at the position a, when a spectral component at the given position a is separated and coded as a tone property component, no quantization noise is heard. Thus, the aforementioned minimum x is determined to be the coding precision of a tone property component at the given position a.

Then, in step S5, a spectral width (number of spectral components constituting tone property components) of tone property components is determined. That is, if the absolute value of a spectral component at a given position a is represented as SPE(a), it is assumed that the spectral width of the tone property component is constituted of respective continuous spectral components containing i=0 satisfying SPE(a)−SPE (a+i)<SNR (x). The width of that continuous spectrum is determined to be the tone property component width.

Then, in step S6, as regards the tone property components in the spectrum width determined in step S5, the number of bits for the coding necessary for extracting as tone property components is calculated and the result is entered into a variable Br.

Then, in step S7, with the tone property components having the spectrum width determined in step S5, the number of bits, which decreases as compared to the coding before extracting the tone property components, when remaining noise property components after those tone property components are extracted are coded, is calculated and entered into a variable Bd.

Then, in step S8, it is confirmed that the number of bits necessary for the coding decreases by actually extracting the tone property components as compared to the variable Br with the variable Bd. Here, when the variable Br is smaller, the tone property components are assumed to be valid. Then, the processing proceeds to step S9. Otherwise, you go to step S10.

Figure 12A:
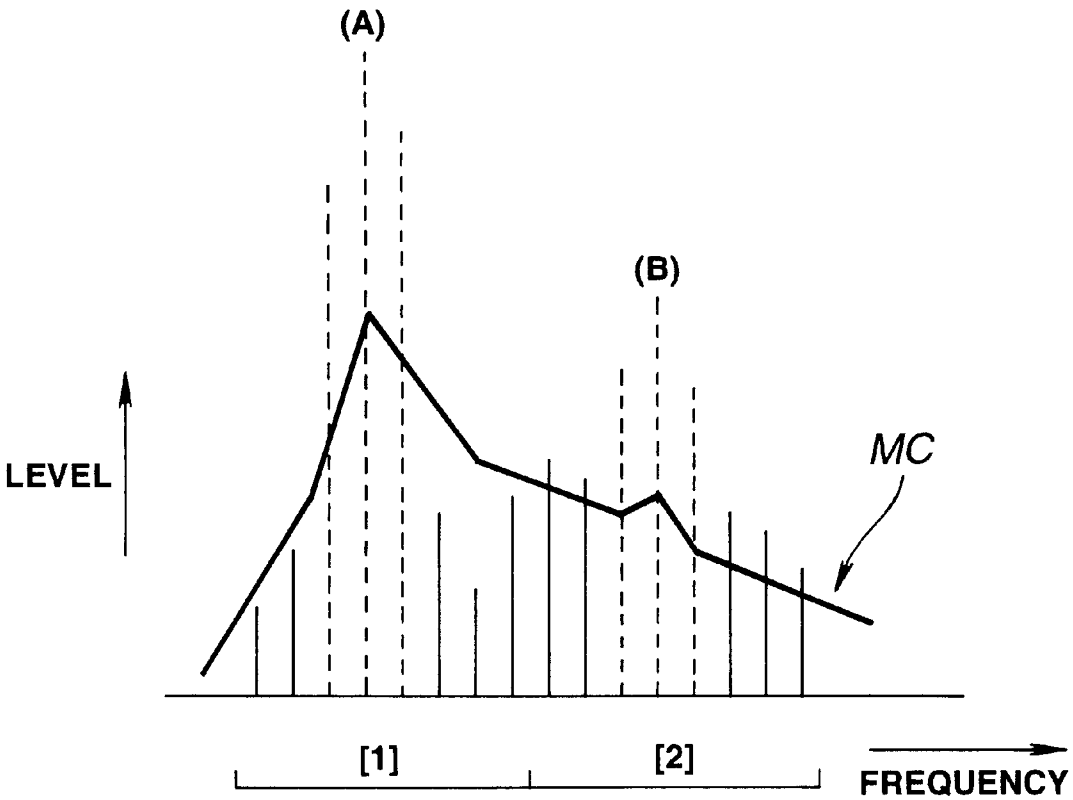
FIGS. 12A, 12B are diagrams for explaining extraction of spectrum of the tone property components.
Figure 12B:
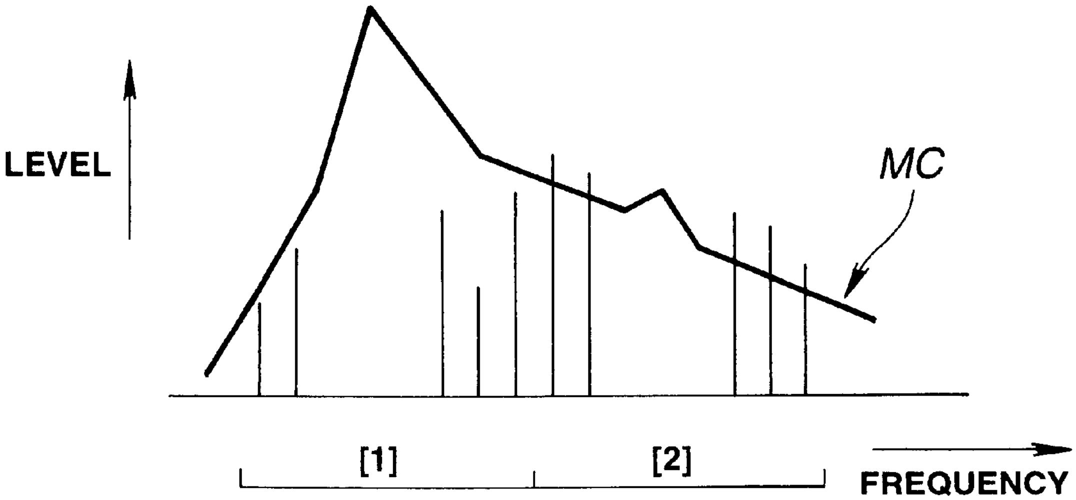

Here, the step S8 will be explained more in detail. Referring to FIGS. 12A and 12B, MC indicated by a bold line indicates a masking level obtained based on minimum audible level, loudness characteristic and the like. Bands [1] and [2] are blocked by dividing a certain spectrum into specified frequency bands as in FIGS. 2 and 4. In this Figure, thee spectrum indicated by broken lines is spectrum to be extracted as tone property component spectrum and the spectrum indicated by real lines indicates the other spectrums. In this FIG. 12A, because the spectrums (A) and (B) are apart from the masking level at a given distance, they are assumed as candidates for tone property component spectrum.

Then, FIG. 12B shows a state in which the tone property components are extracted from the overall spectrum as objects to be separated from the other spectrum and coded. In this Figure, paying attention to the band [1], the spectrums indicated by the real lines do not exceed the masking level. Thus, even if these spectrums are coded faithfully and transmitted or coded as 0 and transmitted, they are masked at the decoding side so as to produce no difference in terms of auditory sense. Thus, it is possible to code them as 0 thereby improving coding efficiency.

On the other hand, in the band [2], the spectrums indicated by the real lines exceed the masking level. Thus, they cannot be coded as 0 unlike in the band [1], therefore it is necessary to code every spectrum. Thus, even if the spectrum (B) is separated and coded as tone property component, the coding efficiency is not improved as expected.

In step S9, the appropriate tone property components recognized to be effective for increasing the coding efficiency are separated.

Then, in step S10, regardless of whether or not extraction of the tone property components occurs, an analysis flag is placed on respective spectral components the width of which determined in step S5. Thus, it is possible to prevent the same spectral components from being analyzed double to decrease the coding efficiency. Thereafter, the processing returns to step S1.

By repeating the above-mentioned processing for every spectrum, it is possible to extract the tone property component spectrums effectively.

By using the masking level for calculation of tone property component separation and processing whit confirming that the number of bits decreases at the time of extraction, it is possible to perform optimum separation processing of the tone property components.

Of these separated frequency components, tone property components having a steep spectral distribution as mentioned above are coded by means of the tone property component coding circuit 105 by using the masking level obtained by the psychoacoustic model application circuit 103 and sent to a code string generation circuit 107. On the other hand, the aforementioned noise property components which are spectral components other than the tone property components are coded by means of the noise property component coding circuit 106 by using the masking level obtained by the psychoacoustic model application circuit 103 and sent to the code string generation circuit 107. The coding processings of the tone property component coding circuit 105 and the noise property component coding circuit 106 utilize different coding processing methods from each other. That has been disclosed in the specification and drawing of the aforementioned U.S. patent application Ser. No. 08/374,518 by the applicant of the present invention. Therefore, a description thereof is omitted here.

Signals of the tone property components coded by the tone property component coding circuit and the noise property components coded by the noise property component coding circuit 106 are sent to the code string generation circuit 107 and converted into code string signals.

The code string signal generated by the code string generation circuit 107 contains the number of the tone property component information pieces and the positional information of that tone property components. The code string signals composed of these pieces of information are sent to the ECC (error correction code) 108. The ECC encoder 108 adds an error correction code to a code string signal sent from the code string generation circuit 107. The output from the ECC encoder 108 is subjected to 8–14 modulation used in, for example, compact disks (trademark) by means of a modulation circuit 109 and supplied to a recording head 110.

This recording head 110 records a code string supplied from the modulation circuit 109 in disk 111. As the disk 111. for example, a magnet-optical disk or a phase-change disk may be used. Further, an IC card may be used instead of the disk 111. Although not represented by any drawing, the code string may be transmitted through a transmission line. An embodiment of the elements of the present invention is carried out by electronic circuits. If the present invention is carried out by computer programs, it does not depart from the spirit and gist of the present invention.

Figure 7:
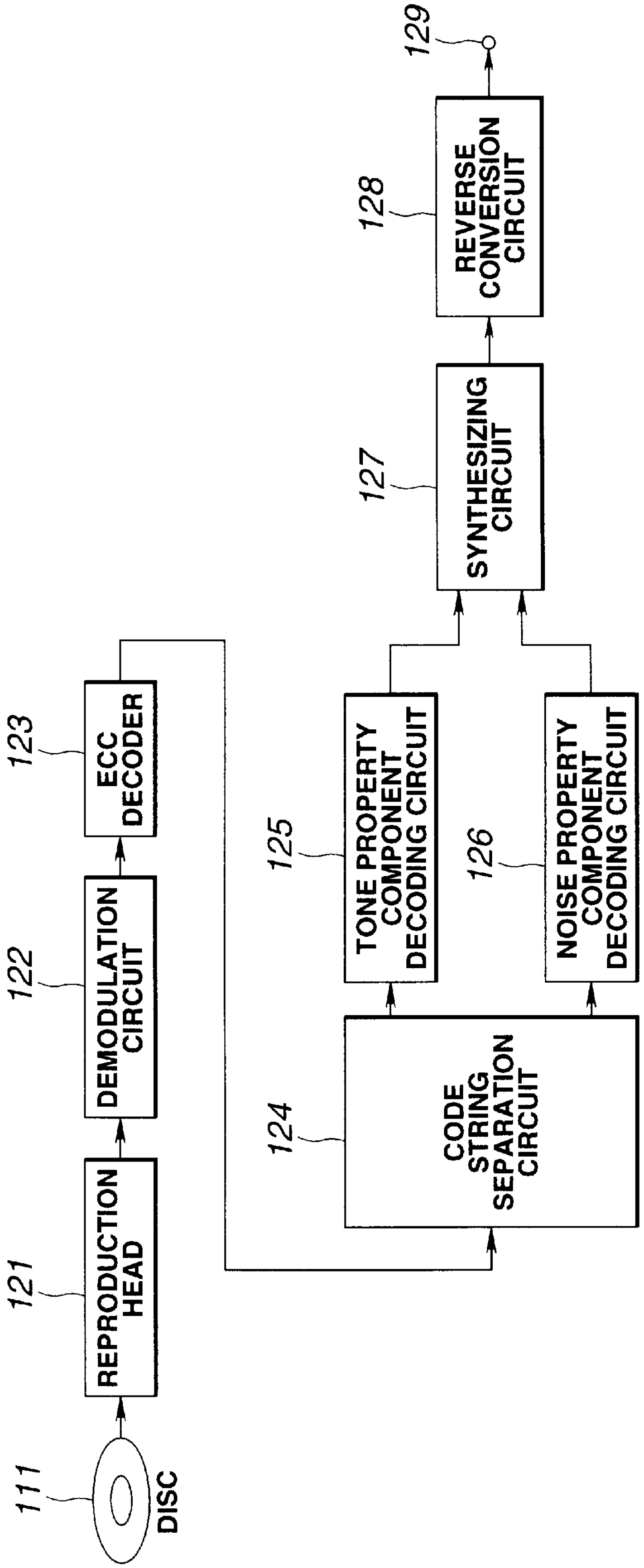
FIG. 7 is a block circuit diagram showing a schematic arrangement of a signal decoding apparatus for implementing signal decoding corresponding to the signal coding method of the present invention.

Next, FIG. 7 shows a schematic arrangement of the decoding apparatus for decoding a signal coded by the coding apparatus shown in FIG. 1.

Referring to FIG. 7, the code string signal reproduced by a reproduction head 121 from the disk 111 is supplied to a demodulation circuit 122. The demodulation circuit 122 demodulates the supplied code string signal. The demodulated code string signal is supplied to an ECC decoder 123, where an error is corrected.

Based on the number of pieces of the tone property component information and its positional information in the code string signal in which errors are corrected, the code string disassembly circuit 124 identifies which part of the cord string is the tone property component code and separates the supplied code string into the tone property component code and the noise property component code. The tone property component code is supplied to the tone property component decoding circuit 125 and the noise property component code is supplied to the noise property component decoding circuit 126.

The tone property component code separated by the code string disassembly circuit 124 and sent to the tone property component decoding circuit 125 is released from reverse quantization and normalization so as to be decoded, and then sent to a synthesizing circuit 127. The noise property component code separated by the code string disassembly circuit 124 and sent to the noise property component decoding circuit 126 is released from reverse quantization and normalization so as to be decoded and sent to the synthesizing circuit 127.

Based on the positional information of the aforementioned tone property component, the synthesizing circuit 127 adds the aforementioned decoded tone property component at a given position of the noise property component from the noise property component decoding circuit 126 so as to synthesize the noise property component and the tone property component on the frequency axis.

The decoding signal synthesized by the synthesizing circuit 127 is subjected to conversion processing in a reverse conversion circuit 128 which performs reverse conversion corresponding to the conversion in the conversion circuit 102 shown in FIG. 1, so that it is returned from a signal on the frequency axis to an original waveform signal on the time axis. An output waveform signal from the reverse conversion circuit 128 is output from a terminal 129. Meanwhile, details of the reverse conversion circuit 128 will be described later.

Figure 8:
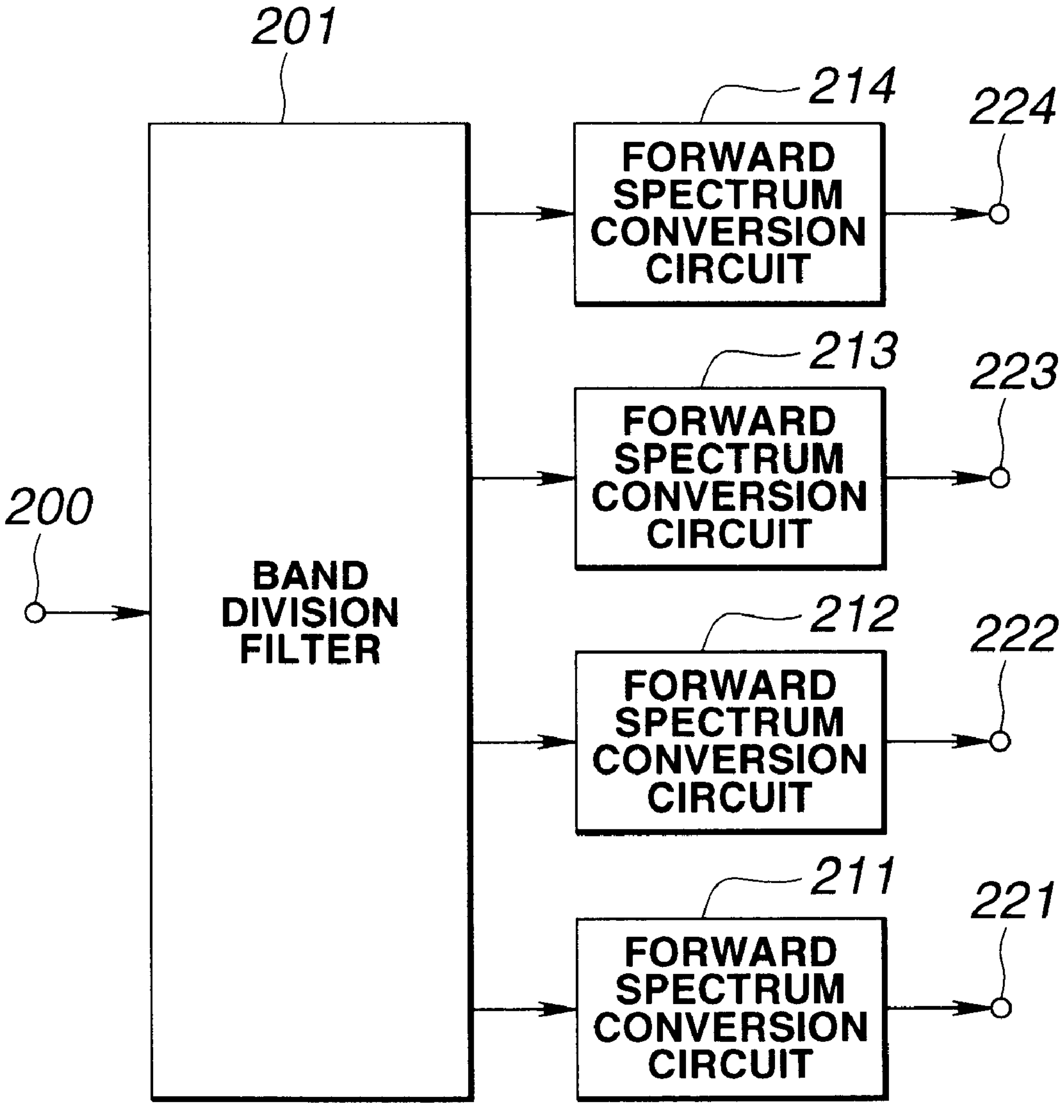
FIG. 8 is a block circuit diagram showing a concrete arrangement of a conversion circuit of the signal coding apparatus which is an example of the arrangement according to the present invention.

Next, an arrangement of the conversion circuit 102 shown in FIG. 1 will be explained with reference to FIG. 8. Referring to FIG. 8, a signal supplied through a terminal 200 (signal supplied through the terminal 101 in FIG. 1) is divided into four bands by, for example, a band division filter 201 in which the aforementioned polyphase quadrature filter is applied. A signal supplied to each of forward spectrum conversion circuits 211–214 has a quarter of the band width of the signal supplied to the the terminal 200 so that the signal from the terminal 200 is divided into ¼ portions. Respective band signals divided into four bands by the band division filter 201 are converted to be spectral components by the sequential spectral conversion circuits 211–214 which perform MDCT spectral conversion or the like. An output from each of the sequential spectral conversion circuit 211–214 is sent to the psychoacoustic model application circuit 103 and the tone property component separation circuit 104 shown in FIG. 1 through each of terminals 221–224.

Of course, as the conversion circuit 102 shown in FIG. 1, a number of arrangements thereof may be conceived in addition to this arrangement. For example, it is permissible to convert input signals into spectral signals directly by Modified Discrete Cosine Transform (MDCT) or by DFT or DCT. Further, it is possible to divide a signal into band components by a band division filter such as the so-called QMF. However, because the method of the present invention is especially effective in a case when energy is concentrated to a specific frequency, it is convenient to use a method of converting to spectral components (frequency components) by means of the aforementioned spectral conversion which can obtain a number of frequency components by a relatively small operating amount.

Figure 9:
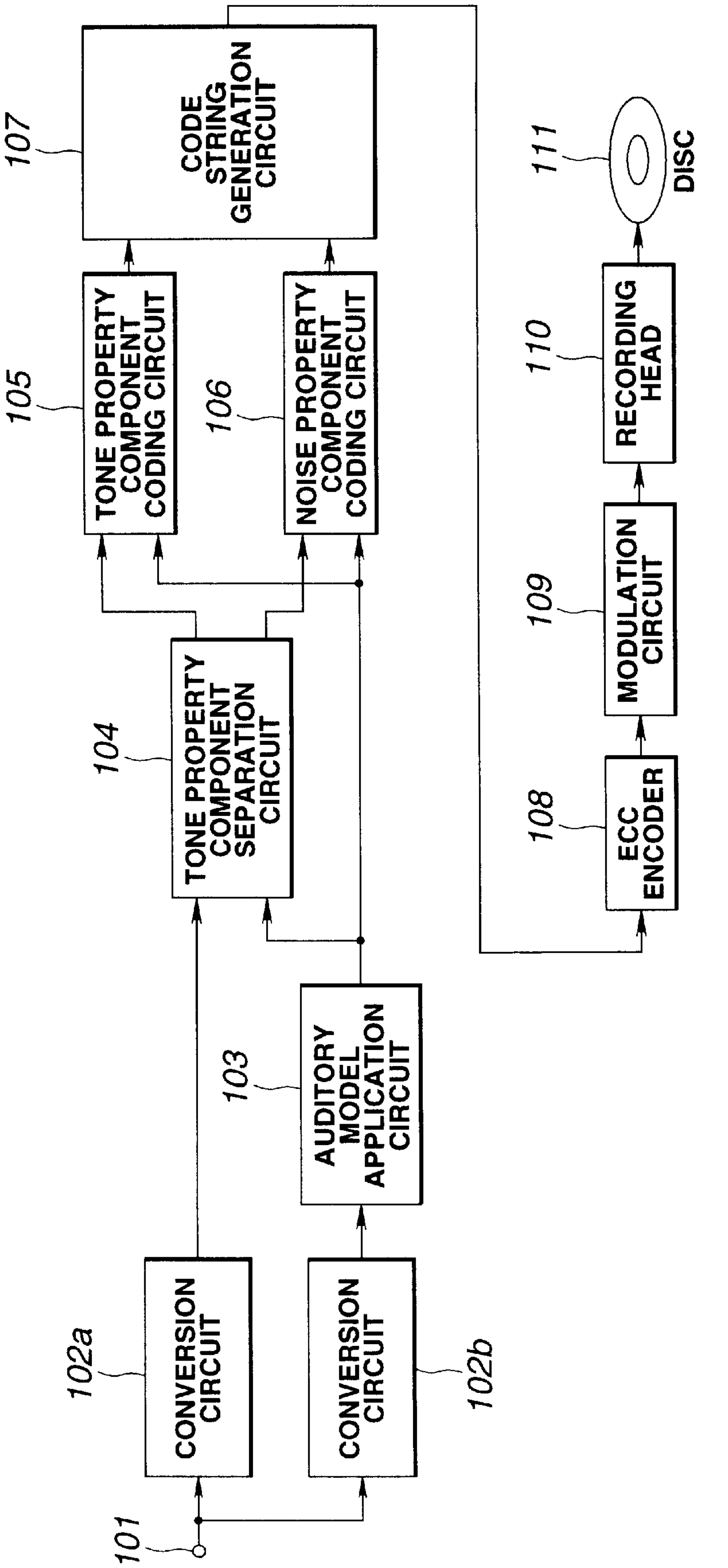
FIG. 9 is a block circuit diagram showing other example of the construction of the signal coding apparatus of the present invention.

In the conversion circuit 102 shown in FIG. 1, although the psychoacoustic model application circuit 103 and the tone property component separating circuit 104 utilize output of the same circuit, for example as shown in FIG. 9, it is permissible to arrange so as to have a conversion circuit 102*a* for converting into spectral components to be used for coding and a conversion circuit 102*b* for converting into spectral components to be used for calculation of the masking level by applying the psychoacoustic model. That is, by having the conversion circuit 102a for coding and the conversion circuit 102b suitable for application of the psychoacoustic model, more appropriate code string generation is made possible. Meanwhile, with respect to the components other than the conversion circuits 102*a*, 102*b*, a description thereof will be omitted because they are the same as the corresponding components in FIG. 1.

Figure 10:
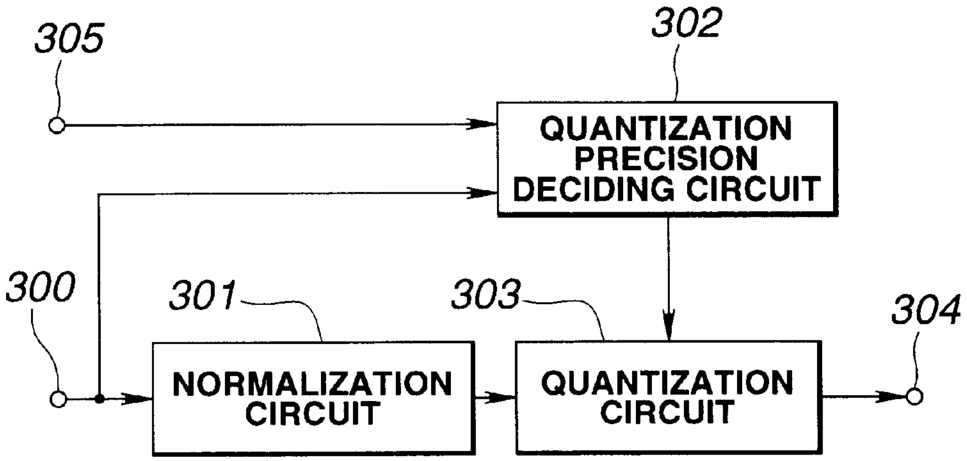
FIG. 10 is a block circuit diagram showing a basic arrangement of a coding circuit of the signal coding apparatus according to the present invention.

FIG. 10 shows a basic arrangement of a circuit for coding the tone property components and the noise property components in the aforementioned construction shown in FIG. 1.

Referring to FIG. 10, a spectral component signal supplied to a terminal 300 is subjected to normalization in every specified band by a normalization circuit 301 and sent to a quantization circuit 303. Further, the signal supplied to the aforementioned terminal 300 and an output from the psychoacoustic model application circuit 103 supplied from a terminal 305 are sent to a quantization precision deciding circuit 302. Based on a quantization precision calculated by the quantization precision deciding circuit 302 by using the signal from the terminal 300 and the masking level information supplied from the psychoacoustic model application circuit 103, the quantization circuit 303 quantizes a signal sent from the normalization circuit 301. An output from the quantization circuit 303 is output from a terminal 304 and sent to the code string generation circuit 107 shown in FIG. 1. In the meantime, the output signal from the terminal 304 contains normalization coefficient information in the normalization circuit 301 and quantization precision information in the quantization precision deciding circuit 302 as well as signal components quantized by the quantization circuit 303.

Figure 11:
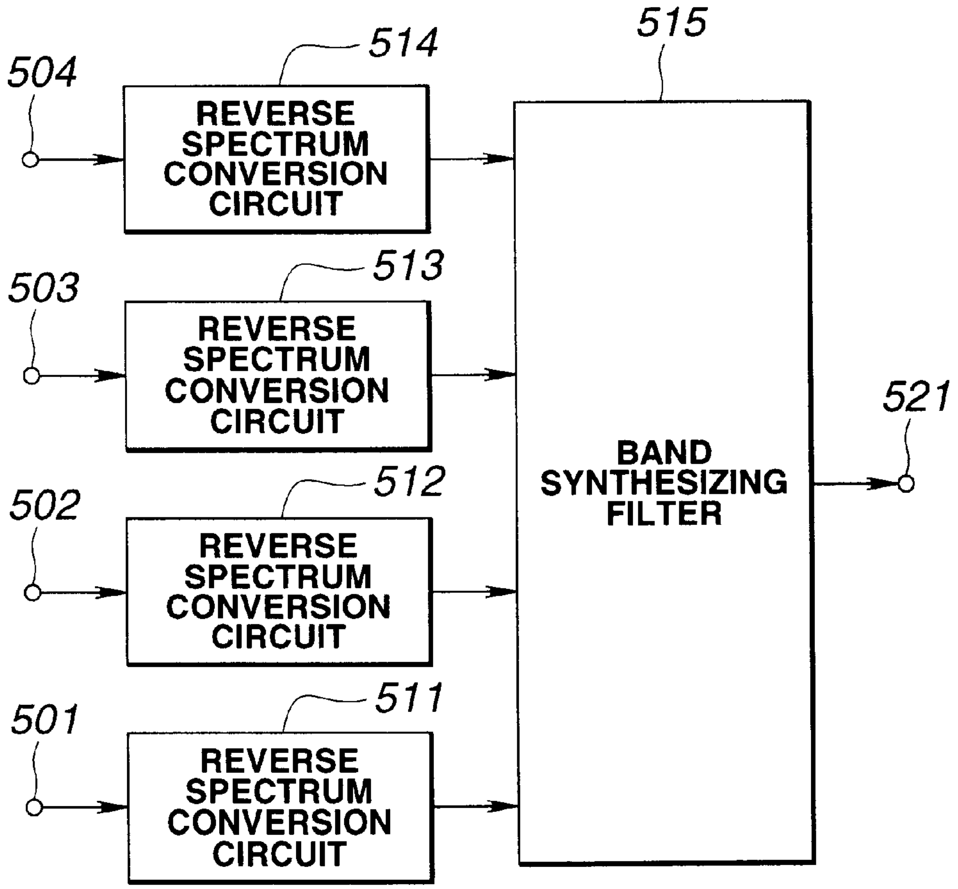
FIG. 11 is a block circuit diagram showing a concrete arrangement of a reverse conversion circuit of the signal decoding apparatus which is an example of the construction of the present invention.

FIG. 11 shows a concrete arrangement of the reverse conversion circuit 128 in FIG. 7 corresponding to the conversion circuit 102 in FIG. 8.

Referring to FIG. 11, a signal supplied from the synthesizing circuit 127 through each of terminals 501–504 is subjected to conversion by each of reverse spectral conversion circuits 511–514 for carrying out reverse spectral conversion corresponding to the forward spectral conversion described in FIG. 8. Signals of respective bands obtained by the reverse spectral conversion circuits 511–514 are synthesized by a band synthesizing filter 515 for carrying out synthesizing processing corresponding to division in the band division filter 201 shown in FIG. 8. An output from the band synthesizing filter 515 is output from a terminal 521.

Although an example in which the signal coding method of the present invention is applied to acoustic signals has been described above, the signal coding method of the present invention may be applied to coding of general waveform signals. However, in the case of the acoustic signal, because the tone property component information has a particularly significant meaning in terms of auditory sense, the signal coding method of the present invention may be applied effectively in particular.

According to the present invention, a high level coding in terms of quality and efficiency has been realized by separating the frequency component obtained by converting an input signal into the tone property component signal and the other component signal by using the masking level obtained based on the psychoacoustic model.

What is claimed is:

1. A signal coding method wherein an input signal is converted into spectral components and each of the spectral components is normalized and quantized by means of allocated bits so as to be coded, said signal coding method comprising the steps of:

converting the input digital signal to the spectral components; separating said spectral components into tone property components and other components by using said spectral components and a masking level obtained based on an psychoacoustic model; and normalizing and quantizing said tone property components and the other components by bits allocated respectively so as to be coded.

2. A signal coding method according to claim 1 wherein said psychoacoustic model is based on at least one of minimum audible level, masking characteristic and loudness characteristic.

3. A signal coding method according to claim 2 wherein said masking level is obtained from the spectral components obtained by converting said input digital signal.

4. A signal coding method according to claim 3 wherein said masking level is obtained for each block obtained by dividing said spectral components into a plurality of frequency bands.

5. A signal coding method wherein an input signal is converted into spectral components and each of the spectral components is normalized and quantized by means of allocated bits so as to be coded, said signal coding method comprising the steps of:

converting the input digital signal to the spectral components;

separating said spectral components into tone property components and other components by using said spectral components and a masking level obtained based on a psychoacoustic model; and normalizing and quantizing said tone property components and the other components by bits allocated respectively so as to be coded;

wherein said psychoacoustic model is based on at least one of minimum audible level, masking characteristic and loudness characteristic;

wherein said masking level is obtained from the spectral components obtained by converting said input digital signal;

wherein said masking level is obtained for each block obtained by dividing said spectral components into a plurality of frequency bands; and wherein the steps in which said spectral components are separated into the tone property components and the other components comprises the steps of:

detecting said spectral components for a presence or absence of an analysis flag;

calculating a difference (SMR) between an absolute value of the level of a given spectral component and said masking level in the case where said analysis flag does not reside;

comparing the difference (SMR) between the absolute value of the level of the given spectral component and said masking level with a given threshold (SNR); and when the difference (SMR) between the absolute value of the level of the given spectral component and said masking level is larger than the given threshold (SNR), determining that spectrum to be tone property component spectrum, adding the analysis flag thereto, and extracting that spectrum.

6. The method of claim 5, further including the steps of:

determining a coding precision for the tone property components spectrum;

extracting other property components spectrum adjacent to said tone property components spectrum;

calculating the number of bits (Br) necessary for coding said tone property component spectrum;

calculating a difference (Bd) between the number of bits necessary for coding the other property components spectrums before said tone property components spectrum is extracted and the number of bits necessary for coding the other property components spectrums after said tone property component spectrum is extracted; and by comparing the number of bits (Br) necessary for coding said tone property components spectrum with said difference (Bd), determining that the extraction of said tone property components spectrum is appropriate when the number of bits (Br) necessary for coding said tone property components spectrum is small.

7. The method of claim 5 wherein said other components are noise components of said spectral components.

8. A signal coding method wherein an input signal is converted into spectral components and each of the spectral components is normalized and quantized by means of allocated bits so as to be coded, said signal coding method comprising the steps of:

converting the input digital signal to the spectral components;

separating said spectral components into tone property components and other components by using said spectral components and a masking level obtained based on a psychoacoustic model;

normalizing and quantizing said tone property components and the other components by bits allocated respectively so as to be coded;

determining a coding precision for the tone property components spectrum;

extracting other property components spectrum adjacent to said tone property components spectrum;

calculating the number of bits (Br) necessary for coding said tone property component spectrum;

calculating a difference (Bd) between the number of bits necessary for coding the other property components spectrums before said tone property components spectrum is extracted and the number of bits necessary for coding the other property components spectrums after said tone property component spectrum is extracted; and by comparing the number of bits (Br) necessary for coding said tone property components spectrum with said difference (Bd), determining that the extraction of said tone property components spectrum is appropriate when the number of bits (Br) necessary for coding said tone property components spectrum is small.

9. The method of claim 8 wherein said psychoacoustic model is based on at least one of minimum audible level, masking characteristic and loudness characteristic.

10. The method of claim 8 wherein said masking level is obtained from the spectral components obtained by converting said input digital signal.

11. The method of claim 8 wherein said masking level is obtained for each block obtained by dividing said spectral components into a plurality of frequency bands.

12. The method of claim 8 wherein said other components are noise components of said spectral components.

13. An apparatus for converting an input signal into spectral components and for normalizing and quantizing each spectral component and by means of allocated bits so as to be coded, comprising:

a conversion circuit for converting an input signal into frequency components;

a psychoacoustic model application circuit for receiving said frequency components and generating corresponding masking levels;

- a tone property component separation circuit for separating the frequency components into a first signal and a second signal;
- a tone property coding circuit for coding said first signal for each specified coding unit in accordance with a psychoacoustic model; and
- a noise property component coding circuit for coding the second signal for each specified coding unit in accordance with the psychoacoustic model.

14. The apparatus of claim 13 wherein said first signal includes tone components and said second signal includes noise components of said spectral components.

15. The apparatus of claim 13 wherein said psychoacoustic model is based on at least one of minimum audible level, masking characteristic and loudness characteristic.

16. The apparatus of claim 13 wherein said psychoacoustic model application circuit generates said masking levels by recalculating a temporary masking level in accordance with one of said minimum audible level, said masking characteristics, or said loudness characteristics from each spectral component for each frequency corresponding to each spectral component.

* * * * *